US010505902B2

(12) United States Patent
Kumar et al.

(10) Patent No.: US 10,505,902 B2
(45) Date of Patent: Dec. 10, 2019

(54) SECURELY IDENTIFYING A DEVICE USING A DNS-CONTROLLED PROXY (71) Applicant: Adobe Inc., San Jose, CA (US)

(72) Inventors: Kanuj Kumar, New Delhi (IN); Mansukh Patidar, Greater Noida (IN)

(73) Assignee: Adobe Inc., San Jose, CA (US)

( * ) Notice: Subject to any disclaimer, the term of this patent is extended or adjusted under 35 U.S.C. 154(b) by 218 days.

(21) Appl. No.: 15/701,196

(22) Filed: Sep. 11, 2017

(65) Prior Publication Data
US 2019/0081932 A1 Mar. 14, 2019

(51) Int. Cl.
H04L 29/06 (2006.01)
H04L 29/12 (2006.01)
H04L 9/32 (2006.01)

(52) U.S. Cl.
CPC ...... H04L 63/0281 (2013.01); H04L 61/1511 (2013.01); H04L 63/0876 (2013.01); H04L 63/0884 (2013.01); H04L 9/321 (2013.01); H04L 63/0823 (2013.01)

(58) Field of Classification Search
CPC ............. H04L 63/0281; H04L 61/1511; H04L 63/0876; H04L 63/0884; H04L 9/321; H04L 63/0823
See application file for complete search history.

(56) References Cited

U.S. PATENT DOCUMENTS

| 2013/0318167 | A1* | 11/2013 | Sereboff | G06Q 10/109 709/204 |
|---|---|---|---|---|
| 2016/0344721 | A1* | 11/2016 | Odom | G06F 9/46 |
| 2017/0070478 | A1* | 3/2017 | Park | H04L 67/04 |
| 2017/0111322 | A1 | 4/2017 | Patidar | |
| 2017/0279688 | A1* | 9/2017 | Shao | H04L 41/20 |
| 2018/0137261 | A1* | 5/2018 | Lattin | G06F 21/12 |

* cited by examiner

Primary Examiner — Meng Li
(74) Attorney, Agent, or Firm — Kilpatrick Townsend & Stockton LLP (57) ABSTRACT Systems and methods for identifying a device identifier of a computing device using a browser. A proxy executing on a computing device holds open a connection request from a browser and establishes a secure connection between the proxy and a web server. The proxy sends the first user identifier and the device identifier to a web server. The web server stores the first user identifier and the device identifier as an entry in a cache. The proxy then connects with the browser and establishes a secure connection between the browser and the web server via the proxy. The proxy receives and forwards a second user identifier from the browser to the web server. The web server determines that the second user identifier matches the first user identifier, extracts the associated device identifier, and sends the device identifier to the browser via the proxy.

19 Claims, 9 Drawing Sheets

SECURELY IDENTIFYING A DEVICE USING A DNS-CONTROLLED PROXY

TECHNICAL FIELD

This disclosure relates generally to the secure identification of a device through a web browser. More specifically, but not by way of limitation, this disclosure relates to securely identifying a device through a web browser by way of a DNS-controlled proxy.

BACKGROUND

Providers of software applications use the Internet to streamline the process of installing and updating software applications to/from end user computing devices. A desktop application installed and executing on a user's computing device may manage and automate certain portions of the software download, installation and/or update processes to reduce the amount of required user interaction. For example, such a desktop application can be configured to, without user intervention, automatically perform tasks such as downloading and running an installer program to install a new software application or update a previously installed software application. When performed manually by users, such tasks can be seen as cumbersome and may cause some users to become frustrated and not purchase the new software application.

Typically, a web page of the software application provider's web site relies on a browser and browser plug-in executing on the computing device to determine that the desktop application is available on the computing device to manage the software download, installation and/or update processes. By using the browser plug-in, the provider's web site identifies the computing device and determines the installation state of the desktop application including which of the provider's software applications are installed, available for installation, and/or in need of updating on the computing device. However, to improve browser security, many browser vendors are phasing out support for browser plug-ins. For example, Netscape® Plugin Application Programming Interface (NPAPI) plugins are no longer supported for recent updates of the Google Chrome® browser. Similarly, the Microsoft Windows 10 Edge® browser elevates its security settings to intranet level for requests to access localhost, thereby blocking such calls.

With browser vendors tightening their security standards, there are or soon will be no methods for the software provider's website to securely identify the computing device and link it with software applications installed on the computing device. Without the availability of a browser plug-in, the installation state of the desktop application and the provider's software applications that the user is authorized to access cannot be determined via a web browser and the user may be required to manually perform additional operations to download, install and update new software applications.

SUMMARY

Systems and methods are disclosed herein for determining a device identifier of a computing device using a browser, where the browser security setting prevent the browser from directly retrieving the device identifier from a local cache or other storage of the computing device, such as by using a localhost call. When a browser executing on a computing device is pointed to a web site hosted on a web server, web site returns a script which causes the browser to contact a DNS server to resolve the address of a first subdomain of the website. The first subdomain is implemented as a service of a desktop application used for managing other software applications on the computing device. The DNS server returns the address of a socket proxy running locally on the computing device. The browser then sends a request for a secure connection between the browser and the first subdomain via the proxy.

The proxy holds open the request from the browser and establishes a secure connection between the proxy and the web server via a network. The proxy retrieves a first user identifier and a device identifier associated with the computing device from the local cache of the computing device. The first user identifier is provided by a user to log in to the desktop application running on the computing device. The proxy then sends the first user identifier and the device identifier in a first encrypted message to the web server over the secure network connection. A web server decrypts the first encrypted message and stores the first user identifier and the device identifier as an entry in a cache of the web server. Upon receiving an acknowledgement from the web server via the secure network connection, the proxy establishes the secure connection between the browser and the first subdomain via the proxy. Successfully establishing this connection indicates that the desktop application is in fact installed and running on the computing device.

The proxy next establishes a secure connection between the browser and the web server, i.e., between the browser and the second subdomain, via the proxy. The proxy receives a second encrypted message sent from browser to the web server over this secure network connection. The second encrypted message includes a second user identifier. The second user identifier is provided by the user when attempting to log in to the web site. The proxy forwards, i.e., proxies, the second encrypted message to the web server. The web server decrypts the second encrypted message, determines that the second user identifier matches the first user identifier stored in the cache of the web server, and extracts the device identifier associated with the first user identifier from the cache of the web server. The proxy receives a third encrypted message sent from the web server to the browser over the secure network connection. The third encrypted message includes the device identifier from the web server. The proxy forwards the third encrypted message to the browser. The browser decrypts the third encrypted message to obtain the device identifier. The browser can then forward the device identifier to a top level domain of the web site, which can use that information to determine and display any software applications associated with the user's account that are installed, available for installation and/or upgrading on the computing device

BRIEF DESCRIPTION OF THE FIGURES

Features, embodiments, and advantages of the present disclosure are better understood when the following Detailed Description is read with reference to the accompanying drawings.

FIG. 4, comprising

FIG. 6, comprising

DETAILED DESCRIPTION

Introduction

As discussed above, existing solutions for a web browser to securely determine and identify the user's computing to the software provider's web site are being phased out with recent web browser updates and releases. Without a replacement for such solutions, the software provider's web site cannot determine whether the web browser and a desktop application for managing software downloads, installations, and updates are running on the same computing device. As a consequence, the software provider's web site will not be able to identify which, if any, of its software applications are installed on the computing device and/or require updating. Embodiments described herein replace existing solutions and therefore allow software providers to provide a seamless and streamlined user experience for managing software applications via a web browser.

Embodiments described herein use a web browser, a desktop application, and a secure DNS-controlled socket proxy executing on a computing device to determine a device identifier of the computing device and to thereby facilitate browser-based management of software applications to be downloaded, installed and/or updated to/on the computing device. The use of a web-based software management system in conjunction with the desktop application in accordance with embodiments described herein eliminates the need for the user to manually perform certain additional steps to download, install, and/or update software applications. This results in an improved user experience for software downloads and promotes broader and more rapid adoption of new software applications for the software provider.

In certain embodiments, a software provider makes its software applications and software management functions available through a top level domain of its web site. When the user's web browser is pointed to that top level domain, the user may use the web site's interfaces to log into his online account with the software provider. Web browsers with the previously mentioned heightened security restrictions are unable to execute scripts or other functions received from the web site for directly retrieving the device identifier of the user's computing device from the computing device's local memory. Therefore, in certain embodiments disclosed herein, communications between the web browser and the web site are transparently redirected through a socket proxy operating on the user's computing device. This redirect is accomplished by way of a local Domain Name Server (DNS), which returns the address of the proxy in response to a request to resolve the address of a first subdomain of the web site. The first subdomain may be implemented as a service of the desktop application.

The socket proxy establishes a secure connection with a second subdomain of the software provider's web site. The socket proxy communicates with the locally installed desktop application to request and retrieve the device identifier and a user identifier previously provided by the user when logging into the desktop application. The socket proxy then provides that information to the second subdomain via the secure connection. The second subdomain of the software provider's web site stores the device identifier and user identifier in its local cache.

A secure connection between the browser and the second subdomain is thereafter established through the socket proxy. The browser sends to the second subdomain via the secure proxy connection the user identifier input by the user to log in to his online account with the software provider. Upon receipt of this user identifier, the second subdomain searches its local cache in attempt to find an entry matching the user identifier.

When the second subdomain discovers that it had previously received the same user identifier from the socket proxy, the second subdomain retrieves the associated device identifier of the user's computing device from its cache and sends the device identifier to the web browser via the secure proxy connection. At this point, it is apparent that the desktop application is installed and running on the same computing device as the web browser from which the user has logged in to his online account. The second subdomain can also send to the web browser any other data stored in its cache in association with the user identifier and device identifier, such as data indicating the machine state of the computing device (e.g., indicating which, if any, of the software provider's software applications are installed). Following this sequence, the web browser can provide the device identifier and, if available, the machine state of the computing device to the software provider's software management web page at the top level domain via secure communication. The top level domain can use that information to determine and display those of its software applications that are available for installation and/or upgrading on the computing device.

Certain Definitions

As used herein, the term "desktop application" is an application program used to manage application software. The desktop application may be installed on a user's computing device.

As used herein, the term "device identifier" is an identifier that uniquely identifies a user's computing device.

As used herein, the term "desktop application user identifier" or "desktop user ID" is the username a user uses to log in to the desktop application executing on the computing device.

As used herein, the term "online account user identifier" or "online user ID" is the username a user uses to log in to his online account with the software provider via a web browser.

DESCRIPTION OF CERTAIN EMBODIMENTS

Figure 1:
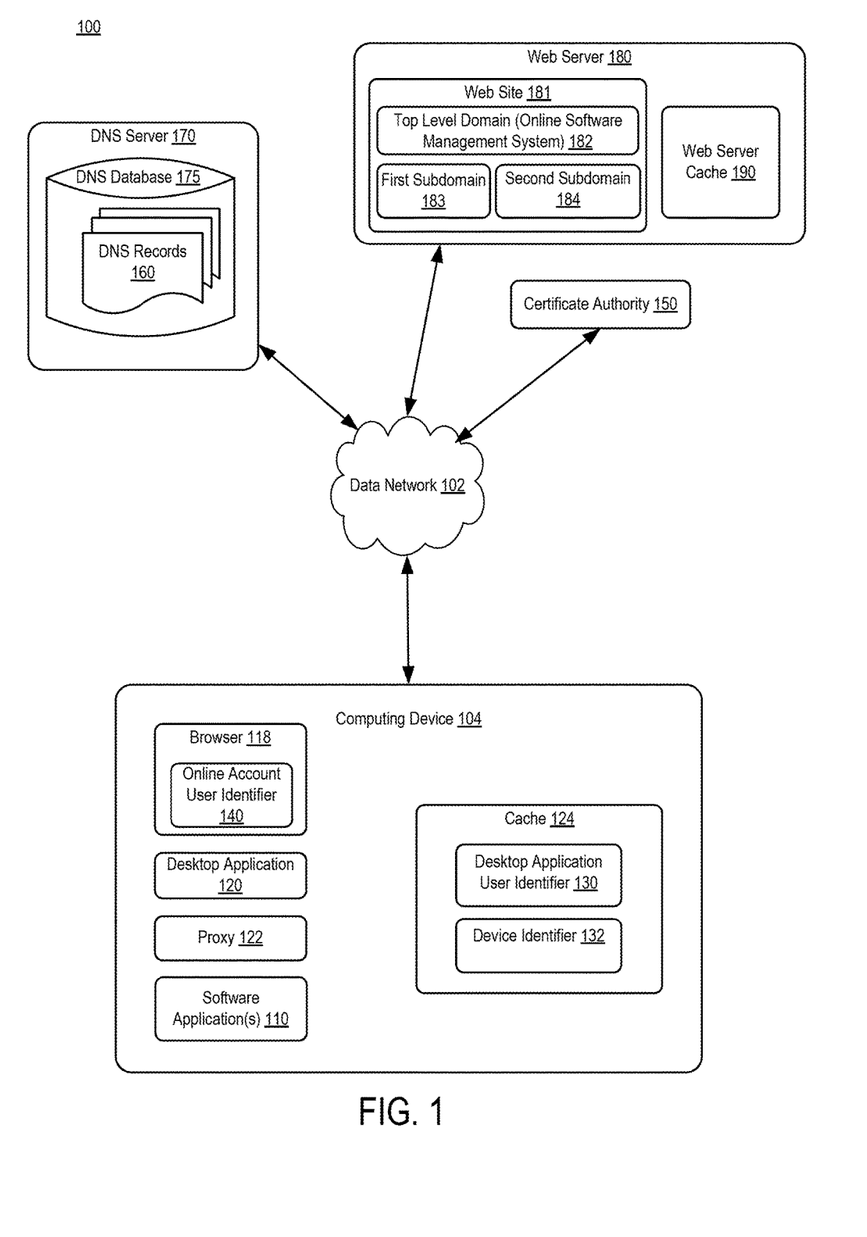
FIG. 1 is a diagram depicting an example of an environment for identifying a computing device using a secure DNS-controlled proxy according to certain embodiments.

The following non-limiting example is provided to introduce certain embodiments. FIG. 1 is a diagram depicting an example of an environment for securely identifying a computing device to a software provider's web site using a secure DNS-controlled proxy, according to certain embodiments. In this exemplary environment, using the various methods described herein, the software provider's web server is able to facilitate web-based software application management on a user's computing device in conjunction with a desktop application installed on the user's computing device.

The exemplary environment 100 consists of a computing device 104, a software provider's local DNS server 170, the software provider's web server 180, and a certificate authority 150. These elements are connected via a data network 102. The data network 102 could be one or more of the Internet, a wide area network (WAN), a local area network (LAN), a wireless network, a public telephone network, an intranet, and/or any other kind of network through which computing devices can communicate with each other.

The software provider's web server 180 may host the software provider's web site 181. The website can include a top level domain 182 and multiple subdomains, e.g., the first subdomain 183 and second subdomain 184. Top level domain 182 may include an interface for a software management system, with which the user interacts via a browser 118. As explained further herein, the subdomains 183 and 184 can be used as part of the process of determining the device identifier 132 of the user's computing device 104. The computing device 104 is configured to execute the browser 118, a desktop application 120, a proxy 122, or a software application 110. The browser 118 can be any browser such as Firefox®, Chrome®, or Internet Explorer®, etc., as long as the browser does not block access to the localhost.

The desktop application 120 provides local application software management functions on the user's computing device 104. For example, the desktop application 120 may identify the software applications 110 locally installed on the computing device and facilitate processes to allow the user to update those software applications with minimal or reduced user intervention. As another example, the desktop application 120 may identify other software applications available from the software provider and facilitate processes to allow the user to download and install those software applications on the computing device 104, again with minimal or reduced user intervention.

In some embodiments, the desktop application 120 is automatically downloaded to and installed on the computing device 104 when the user first creates an online account with the software provider, e.g., via the web site 181. In other embodiments, the desktop application 120 may be automatically downloaded and installed to the computing device when the user first logs into his online account or first downloads a software application from the web site 181. In still other embodiments, the user may be required to interact with the web site 181 or other software provider system to affirmatively download and install the desktop application 120 to the computing device 104. Once installed on the computing device 104, the user may log in to the desktop application 120 using his desktop user ID 130.

To provide a more streamlined browser-based software management system for automating (or at least requiring less user interaction during) processes for downloading, installing, and/or updating software applications 110, the browser 118 may be configured for communicating with and passing information between the desktop application 120 and the web site 181 as described herein. In doing so, the browser 118 is able to securely identify and provide the device identifier 132 to the web site 181, despite heightened browser security mechanisms. Upon receiving the device identifier 132 and the user's online account identifier 140 from the browser 118, the web site 181 is able to determine whether the same user is logged in to the online account via the browser 118 and the desktop application 120 running on the computing device 104. In other words, the web site 181 is able to determine whether the provided online user ID 140 is the same as the desktop user ID 130.

At the start of each new session, when the user points his browser 118 to the top level domain 182 of the software provider's web site 181, communications between the browser and the top level domain 182 are redirected to the proxy 122 executing on the user's computing device 104. In particular, a script running in the browser 118 sends a request to a DNS server 170 to resolve the address of the first subdomain 183, which results in a DNS look-up by way of a DNS server 170. The DNS server 170 is configured to return the address of the proxy 122. The browser will then request to open a connection with the first subdomain 183 via the proxy 122. In some embodiments, the first subdomain 173 is implemented as a service, such as a detect service, executed by the desktop application 120.

As will be understood, the address of the proxy 122 may be an IP address or other network address and may be stored in a DNS record 160 of a DNS database 175 accessible by the DNS server 170. The DNS server 170 may be the software provider's local DNS server, i.e., may be within the software provider's domain. The user may log in to his online account via the top level domain 182 of the web site 181 either before or after the browser is redirected to the proxy 122.

The proxy 122 is used to facilitate secure identification of the device identifier 132 and the desktop user ID 130 to the second subdomain 184 of the software provider's web site 181. In turn, the browser can retrieve the device identifier 132 in an encrypted message from the second subdomain, without having to retrieve the device identifier 132 from the localhost. In some embodiments, the proxy 122 is a socket proxy or other process or component of the desktop application 120. The proxy 122 can be configured to run as a background process even when the desktop application 120 is not open on the computing device 104.

More specifically, because security measures may prevent the browser 118 from directly accessing the device identifier 132 and the desktop application user identifier 130 directly from the local memory (e.g. cache 124) of the computing device 104, the proxy 122 may be configured to do so. The proxy 122 establishes a secure connection with the second subdomain 184 of the software provider's web site 181. For example, the secure connection may be an authenticated and secured connection established using Secure Sockets Layer (SSL) certificates obtained from the certificate authority 150, or another certificate authority. The certificate authority 150 may provide certificates for the top level domain 182. Because certificates valid for the top level domain 182 remain valid for all subdomains such as the first subdomain 183 and the second sub-domain 184, the certificates raise no security concerns.

The proxy 122 may then send the device identifier 132 and the desktop application user identifier 130 in encrypted form to the second subdomain 184 via the secure connection. The second subdomain 184 may thereafter store this information in its local cache 190. For example, the device identifier 132 and the desktop application user identifier 130 may be stored as a tuple in a database table or may otherwise be stored in association with each other in the cache 190. A secure connection may then be established between the browser 118 and the second subdomain 184 via the proxy 122. This secure connection may be established using the same or new SSL certificates. The browser 118 uses this connection to send the online account user identifier 140 to the second subdomain 184 in encrypted form.

The second subdomain 184 is then able to determine whether the online user ID 140 corresponds to an entry in its cache 190. In other words, the second subdomain determines whether the online user ID 140 matches the desktop user ID 130 previously received from the proxy 122. If so, second subdomain 184 retrieves from its cache 190 the device identifier 132 stored in association with the desktop user ID 130 and sends the device identifier 132 to the browser 118 in encrypted form via the secure connection. The browser 118 may then communicate the device identifier 132 to the top level domain 182 of the software provider's web site 181 via a secure connection, such as by using the HTTPS protocol or another suitable secure network communication protocol. The software provider's software management system can then use the device identifier 132 to determine the machine state of the computing device 104 and display via the web site 181 an indication of its software applications not already installed on the computing device 104 and/or installed software applications 110 in need of an update. In the event the user initiates a software download or update through the software provider's web site 181, the online software management system may interact with the desktop application 120 via the secure connection to coordinate such action(s).

Figure 2:
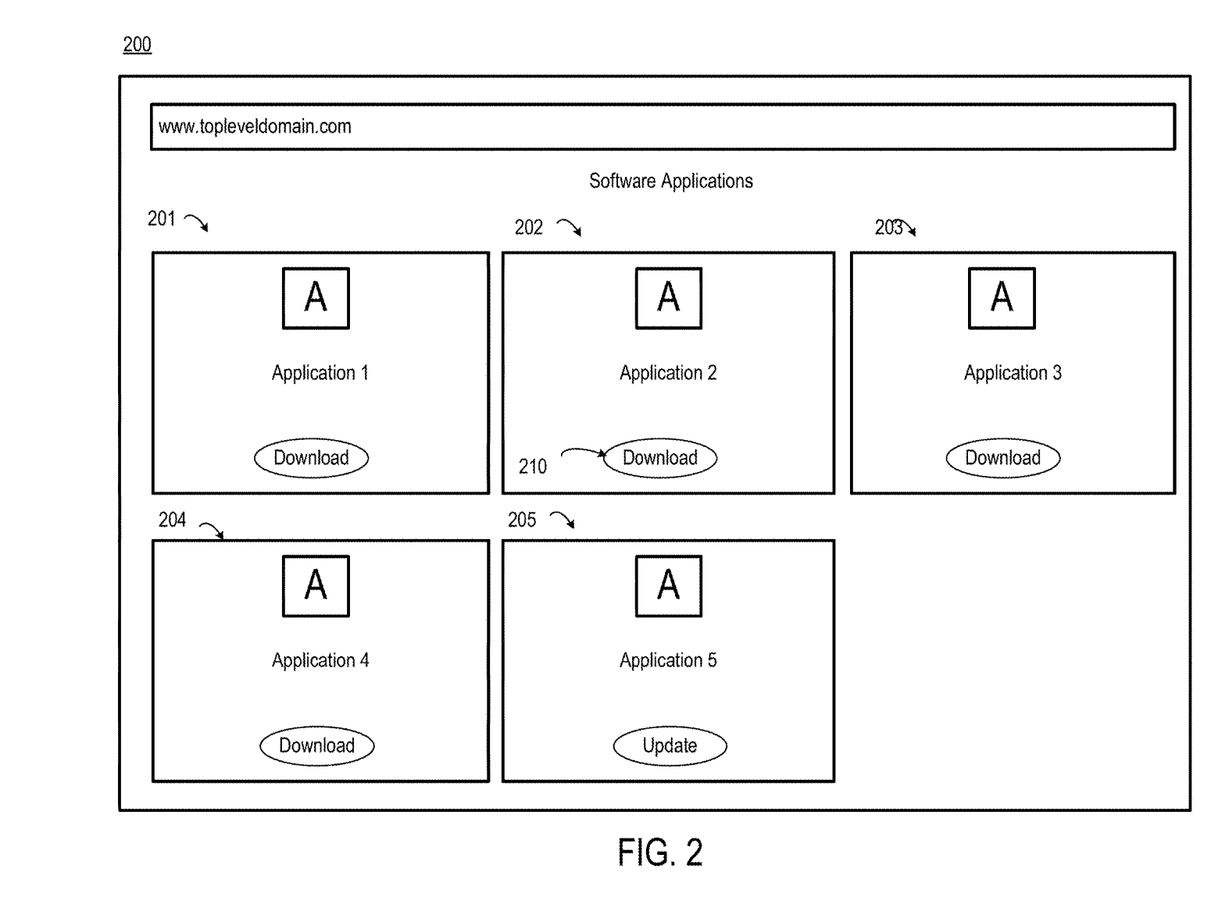
FIG. 2 is a diagram depicting an example user interface of a browser-based software management system capable of facilitating installation and/or updating of application software to a computing device according to certain embodiments.

FIG. 2 is a diagram depicting an example user interface 200 of an online software management system capable of facilitating the installation and removal of application software according to certain embodiments. In certain embodiments, the example user interface 200 is displayed on a web page accessible by a user's computing device at the top level domain of the software provider's web site 181. The user may log into his online account via an interface (not shown) provided at the web site 181. After the device identifier 132 of the user's computing device 104 is provided to the online software management system (i.e., to the top level domain 182) as described herein, the online software management system may determine and display via user interface 200 the software applications 201-205 available from the software provider.

As shown, the user interface 200 may display indications of which of software applications 201-205 are not previously installed on the user's computing device 104 and available for download. The user interface 200 may in some embodiments also display indications of software applications 201-205 that are already installed on the computing device 104 and require an update and/or software applications 201-205 that are installed and ready for use. Selectable buttons, e.g., download button 210 or other mechanisms for inputting appropriate information or commands, may be provided for initiating download, update, open and/or other actions relative to the displayed software applications 201-205. In some embodiments, software applications available from the software provider but already installed and up-to-date on the user's computing device 104 may not be displayed on the user interface 200. Upon the user initiating a download, update, open or other action via the user interface, the online software management system may interact with the desktop application 120 executing on the computing device 104 to automate the selected action, or at least to do so with minimal or reduced user involvement. As discussed, this is made possible by the software provider's web server 180 being able to identify the computing device 104 and the installation state of any of the software provider's software applications 110 thereon.

Figure 3:
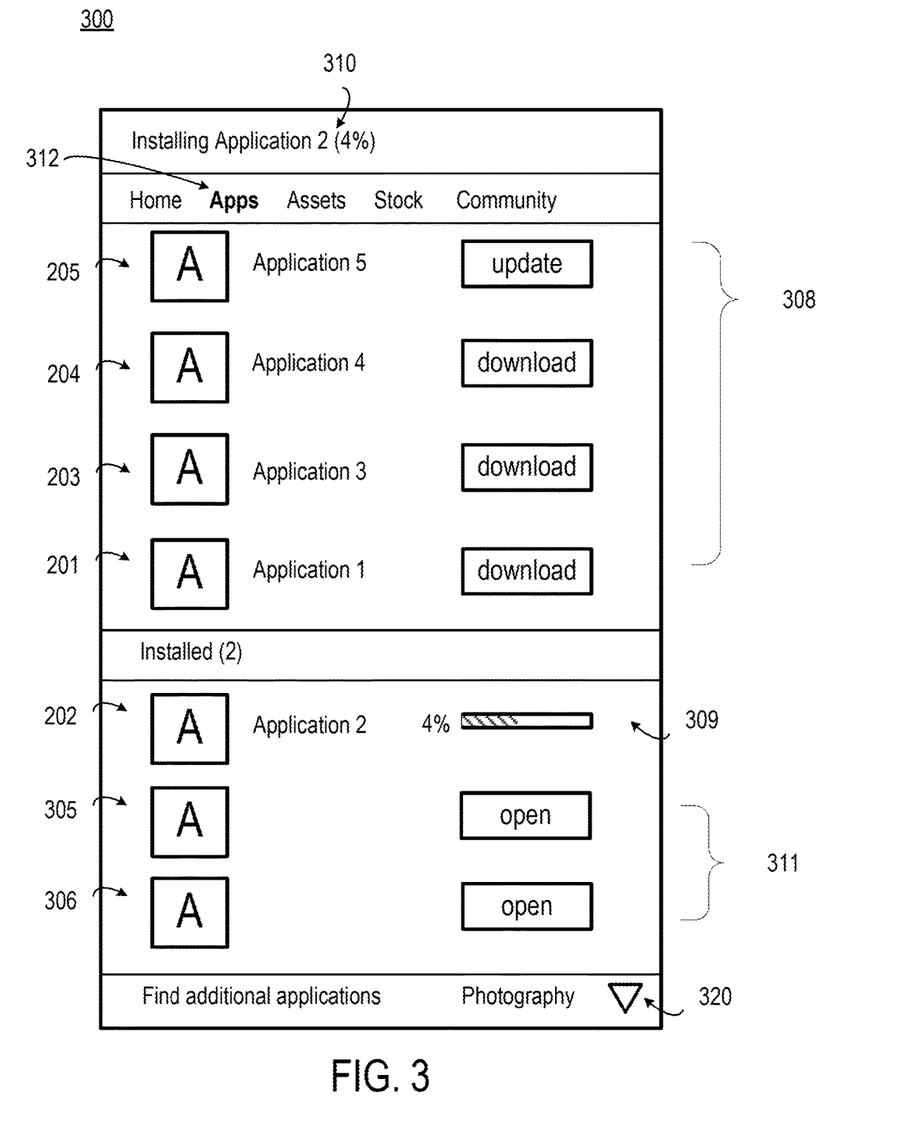
FIG. 3 is a diagram depicting an example user interface of a desktop application executing on a computing device, according to certain embodiments.

FIG. 3 is a diagram depicting an example user interface 300 of a desktop application 120 executing on a computing device 104, according to certain embodiments. The example user interface 300 is configured for managing the process of downloading, installing, updating, launching (also referred to as "opening") and/or other operations for software applications 201-205 and 305-306, according to certain embodiments. As depicted in FIG. 3, the user has triggered the download and installation process for software application 202 by activating the "download" button 210 within the software provider's online software management system (FIG. 2). After doing so, the user may switch to the desktop application 120 to view the desktop application interface 300 and may click on the "Apps" tab 312 to further manage and use the software applications 201-205 and 305-306 available from the software provider.

In this example, the desktop application interface 300 shows a status bar 309 indicating installation progress of software application 202. This installation status is also indicated in a title bar or header 310 of the desktop application interface 300. The desktop application interface 300 also shows that software application 205 is already installed but an update is available. Like the user interface 200 of the online software management system (FIG. 2), the desktop application interface 300 also shows that software applications 201, 203, and 204 are not installed on the computing device 104 but are available for download by the user. The update or download process, as applicable, can be invoked for any of these software applications 201, 203, or 204 by activation of the corresponding "update" or "download" buttons 308 or by other mechanism for inputting an appropriate command. The desktop application interface 300 further shows that software applications 305-306 are installed and ready to open using corresponding "open" buttons 311 or via other input command mechanisms. As shown in this example, additional software applications, if any, available from the software provider may be discovered and displayed by selecting an application category of interest using an dropdown menu 320 or other suitable input mechanism.

Figure 4A:
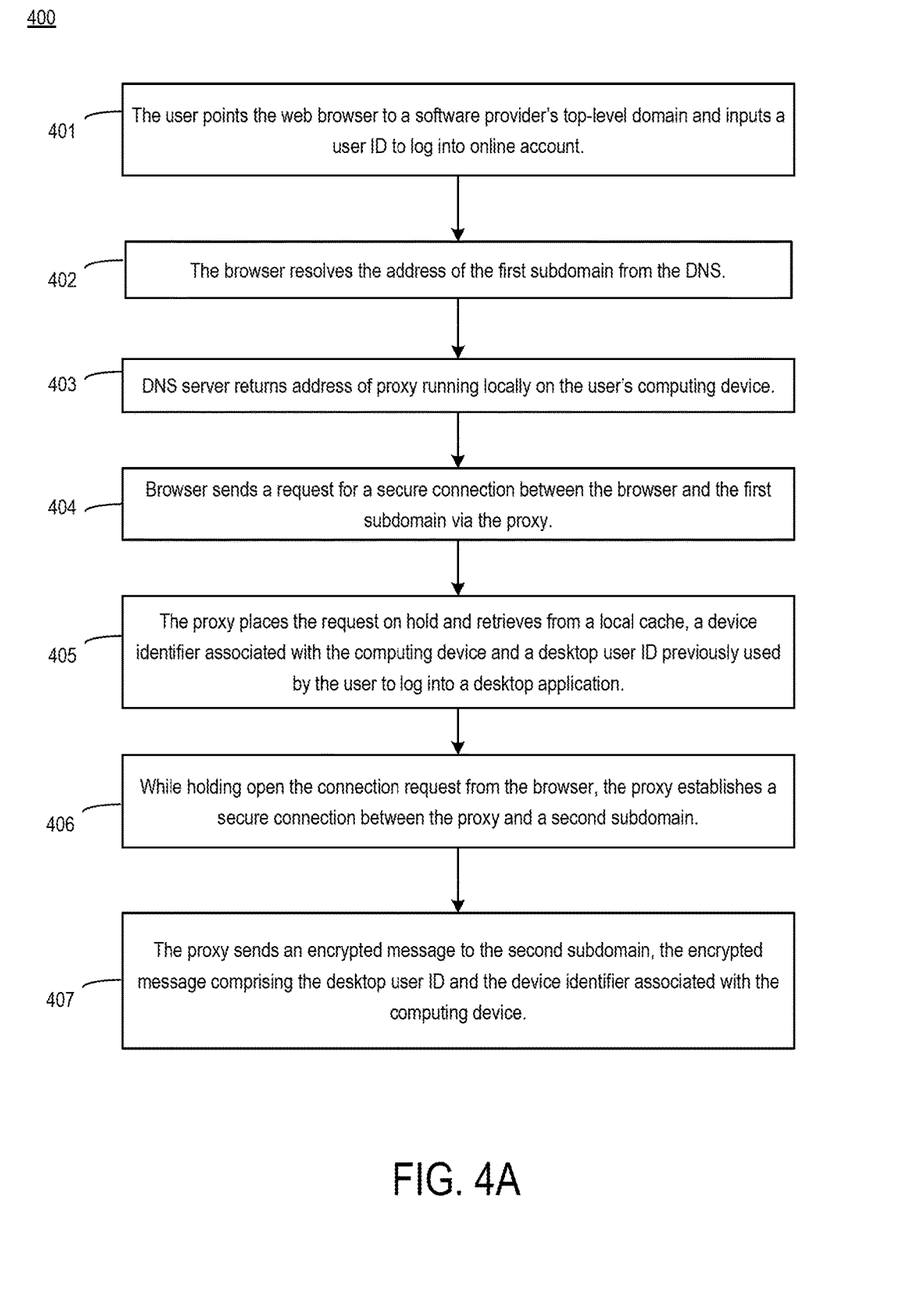
FIGS. 4A and 4B, is a diagram depicting an example processing flow for securely identifying a computing device to a software provider's web site through a browser using a secure DNS-controlled proxy, according to certain embodiments.
Figure 4B:
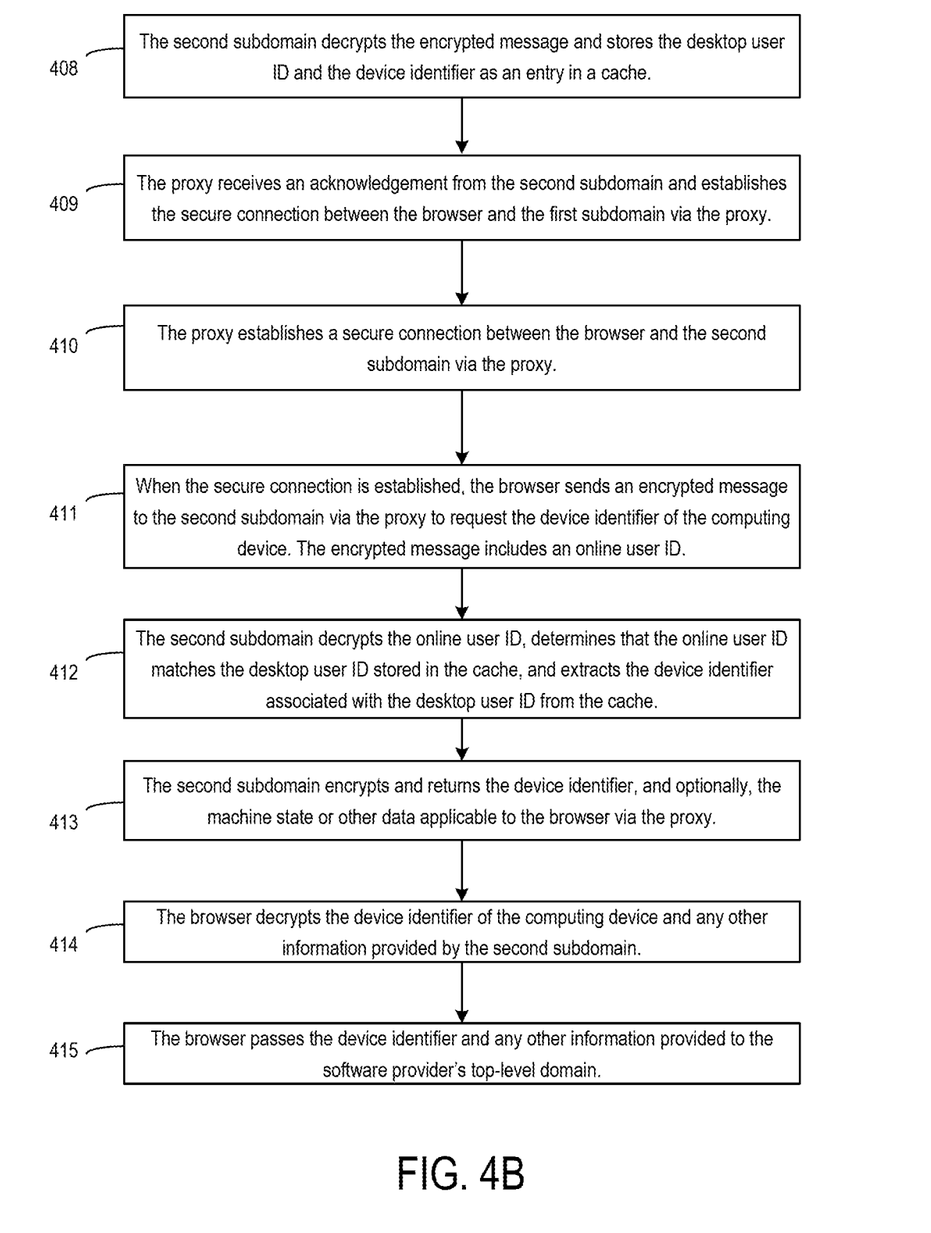
Figure 6A:
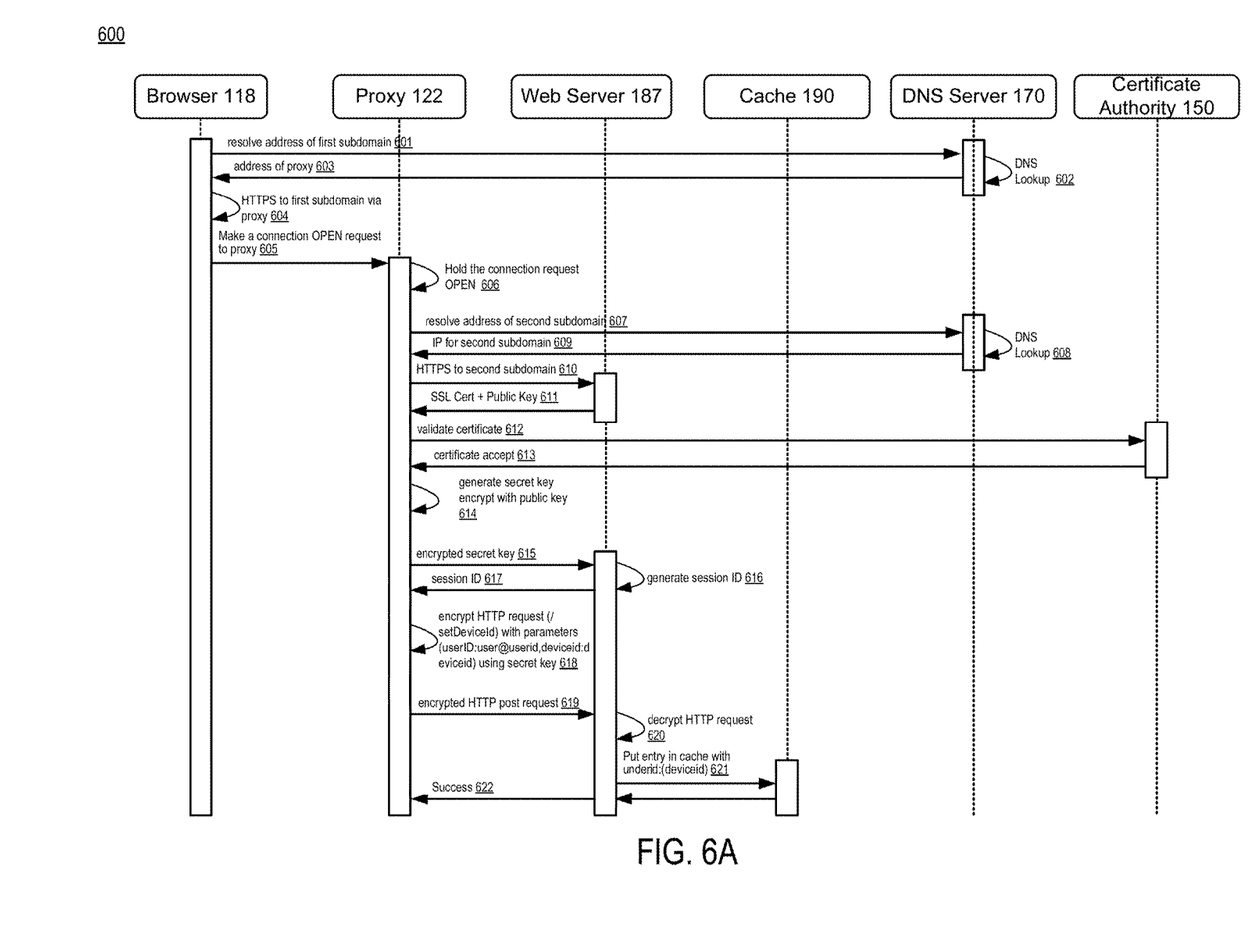
FIGS. 6A and 6B, is a diagram depicting examples of data transaction sequences between devices in a network environment for securely identifying a device using a secure DNS-controlled proxy.
Figure 6B:
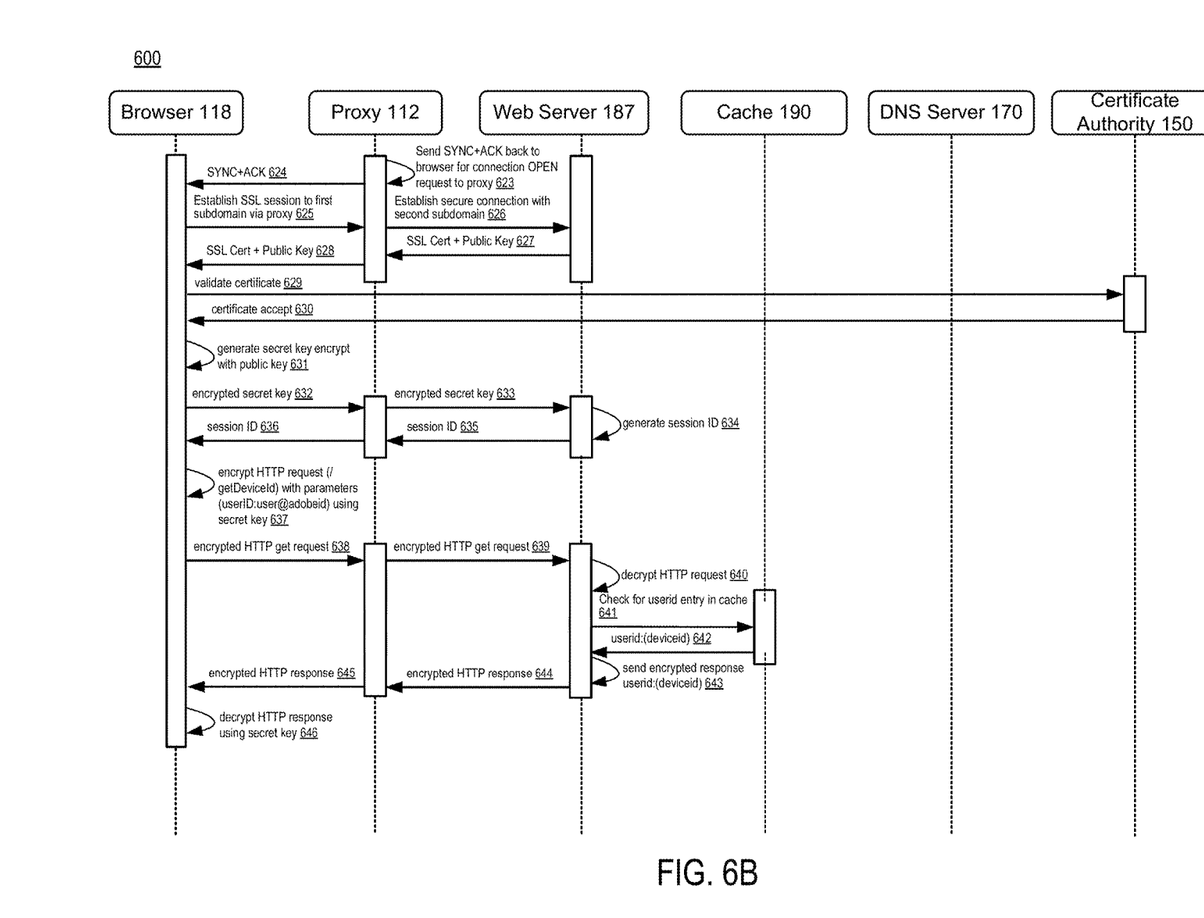

FIG. 4, comprising FIGS. 4A and 4B, is a diagram depicting an example processing flow for securely identifying a computing device to an online software management system accessed through a software provider's web site through a browser using a secure DNS-controlled proxy, according to certain embodiments. The method described in FIGS. 4A and 4B can be used in conjunction with the data transaction sequences described in FIGS. 6A and 6B, but other data transaction sequences, signal flows, and methods are possible.

At block 401, the method 400 involves a user pointing the browser 118 to a top level domain 182 of a software provider's web site 181 to access an online software management system. In this example, the user inputs his online user ID 140, password and/or other credentials to log into his online account as part of block 401. In other embodiments, the online user ID 140 may be input by the user as part of a later step of method 400. In some embodiments, the user may not yet have credentials, and will therefore be redirected to the appropriate web page of the web site 181 in order to create an online account.

At block 402, a script running in the browser 118 resolves the address of a first subdomain 183 of the web site 181 from the DNS server 170. At block 403, in response to this request, the DNS server 170 responds with the network address of a proxy 122 running locally on the user's computing device 104. As will be appreciated, the user's internet service provider (ISP) typically resolves the initial request for the top level domain 182, but a DNS server 170 within the domain of the web server 180 will usually resolve the addresses of subdomains. This redirection to the proxy 122 may occur transparently from the user's perspective. In other words, the browser 118 remains pointed to and continues to display the webpage at the top level domain 182, while the redirection occurs and the following steps of method 400 are performed.

At block 404, the browser 118 sends a request to connect with the first subdomain 183 via the proxy 122. In some embodiments, the first subdomain 183 is a service executing in the desktop application 120. The browser 118 therefore uses this connection request as a way to detect whether the desktop application 120 is installed on the computing device 104. If the connection request fails, the browser 118 determines that the desktop application 120 is not installed on the computing device 104.

At block 405, the proxy 122 places the connection request from the browser 118 on hold and then retrieves from a local cache 124 a desktop user ID 130 previously used by the user to log into the desktop application 120, along with a device identifier 132 associated with the computing device 104. In cases where the user is not or has not previously logged in to the desktop application 120, the user can be required to do so at this point. In other embodiments, the proxy 122 may retrieve this information from the cache after block 406 is completed. At block 406, while holding open the connection request from the browser 118, the proxy 122 establishes a secure connection between the proxy 122 and the second subdomain 184 of the website 181 via a data network 102. In some embodiments, the subdomain 184 is provided at the web server 180.

At block 407, the proxy 122 sends an encrypted message to the second subdomain 184 over the secure connection. The encrypted message includes the desktop user ID 130 and the device identifier 132 previously accessed from the cache 124 of the computing device 104. In some embodiments, the encrypted message may also include the machine state corresponding to the software application 110 installed on the computing device 104. The machine state information may also be retrieved from the cache 124 in some examples.

At block 408, the second subdomain 184 decrypts the message from the proxy 122 and stores the desktop user ID 130 and the device identifier 132 as an entry (e.g., a tuple) in a cache 190 local to the web server 180. This entry in the cache 190 will later be used to facilitate a server-side verification that the browser 118 and the desktop application 120 are executing on the same computing device 104, meaning that the user attempting to log into the online account via the web site 181 is the same as the user logged into the desktop application 120.

At block 409, the proxy receives an acknowledgement from the second subdomain 184 and then resumes the process of establishing the connection between the browser 118 and the first subdomain 183 via the proxy 122.

At block 410, the proxy 122 establishes a secure connection between the browser 118 and the second subdomain 184 via the proxy 122. At block 411, when the secure connection is established, the browser 118 sends an encrypted message to the second subdomain 184 via the proxy 122 to request the device identifier 132 of the computing device 104. The request includes the online user ID 140 as a parameter. Again, the user may have previously input the online user ID 140 to the browser 118, or may be prompted to do so at this point. Because messages sent between the browser 118 and the second subdomain 184 are encrypted, the proxy 122 is unable to extract their contents.

At block 412, in response to receiving the request from the browser, the second subdomain 184 decrypts the request message, extracts the online user ID 140, and searches its cache 190 for a matching entry. Because the cache 190 stores the desktop user ID 130 in association with the device identifier 131, finding a match between the online user ID 140 and the desktop user ID 130 will indicate that the same user is logged in to the user's online account and the desktop application 120, and that the desktop application 120 is installed on the same computing device 104 as the proxy 122.

When the second subdomain 184 determines that the online user ID 140 matches the desktop user ID 130 previously stored in the cache 190, it extracts the device identifier 131 that is associated with the desktop user ID 130 in the cache 190. In the event no matching entry is found in the cache 190 for the online user ID 140, the browser 118 receives a negative acknowledgement from the second subdomain 184 and treats this situation as if the desktop application 120 is either not installed or not running on an authorized computing device 104, or a different user is logged on to the desktop application 120 than is logged in to or attempting to log in to the online account via the browser 118. In this case, the browser exits from method 400 and continues its normal operations and interactions with the top level domain 182.

At block 413, the second subdomain 184 encrypts and returns the device identifier 131 to the browser 118 via the proxy 122. If available in cache 190, the encrypted message may also include the machine state or other data applicable to the computing device 104. Again, the proxy 122 forwards this encrypted message to the browser 118 without decrypting it, which ensures compliance with browser security standards.

At block 414, the browser 118 decrypts the response from the second subdomain 184 to extract the device identifier 131 and any other information (e.g., machine state) provided in that message.

At block 415, the browser passes the device identifier 131 and any other information it has relating to machine state to the top level domain 182 via a secure connection, e.g., a HTTPS session. After receiving the device identifier 131, the online software management application at the top level domain 182 may query its own data tables to determine and display the software provider's application programs that are not installed on the computing device 104, or are installed on the computing device 104 but are ready for updating, as shown in and discussed with respect to FIGS. 2 and 3.

Figure 5:
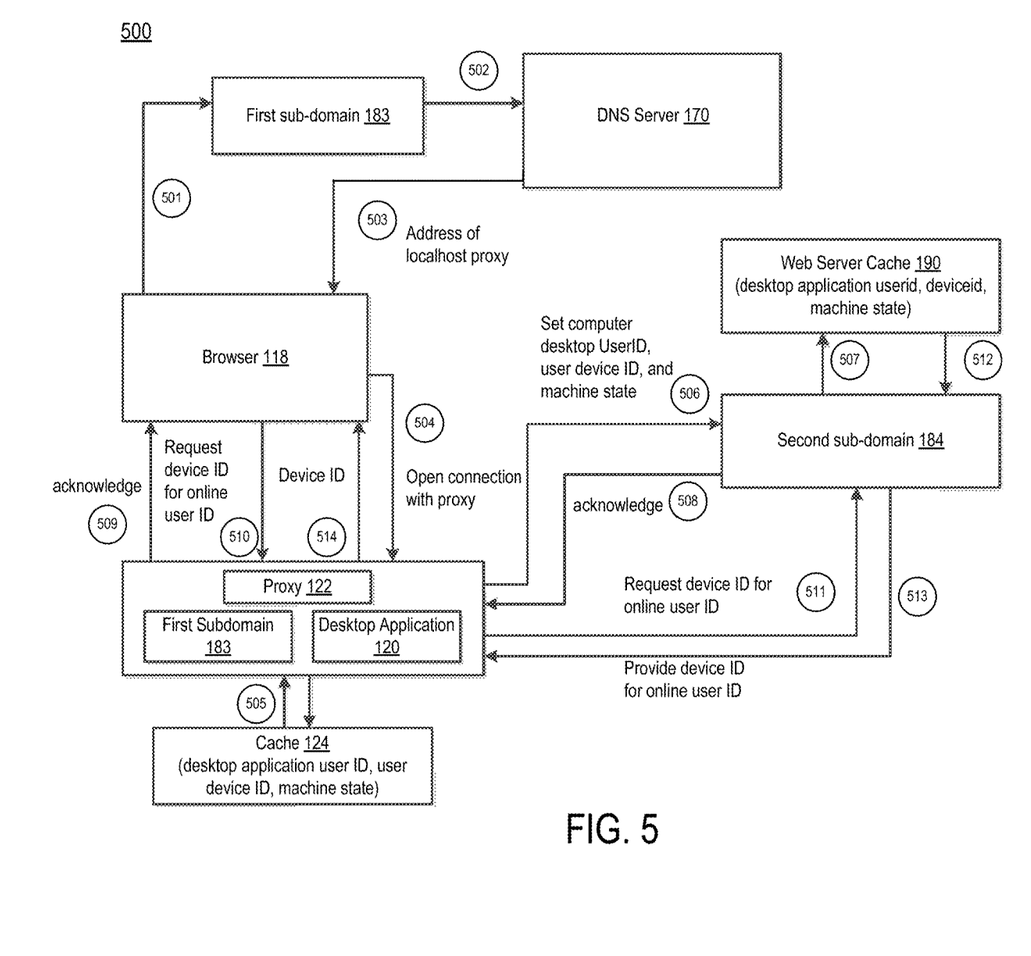
FIG. 5 is a diagram depicting an example process flow for securely identifying a computing device using a secure DNS-controlled proxy according to certain embodiments.

FIG. 5 is a diagram depicting an example process flow for securely identifying a device using a secure DNS-controlled proxy according to certain embodiments. For illustrative purposes, the example process 500 is described in conjunction with the example data transaction flows depicted in FIG. 6 between the relevant devices. As will be appreciated, other implementations of the process and/or the transaction flow shown in and described with respect to FIGS. 5 and 6 are possible.

The exemplary process flow shown in FIG. 5 and the corresponding example transaction flow shown in FIG. 6 begin when a user visits the software provider's web site 181, e.g., the top level domain 182 of the web site 181, using the browser 118 to log into his account for managing his software applications 110. At that point, a script provided to the browser by the top level domain 182 makes a call (501)

to the first subdomain 183. This causes the browser 118 to send a request (502, 601) to a DNS server 170 to for a DNS look-up (602), which results in return (503, 603) to the browser 118 of the address of the proxy 122. In some embodiments, the script run in the browser 118 may attempt to load a test asset from the first subdomain 183. The test asset can be any suitable type of asset, such as an image, text, a video, and so forth.

After receiving the address of the proxy 122, the browser 118 attempts to establish a connection with the first subdomain 183 of the software provider's web server 180 via the proxy 122. As an example, the browser 118 generates (604) the request to establish the connection with the first subdomain 183 and then opens (605) a TCP connection on a port of the localhost address of the proxy 122.

If a connection cannot be established with the proxy 122, the browser 118 treats this as if the proxy 122 and/or the desktop application 120 is not be installed or is not running. Consequently, the browser 118 may exit the processes described in FIGS. 5 and 6 and resume its normal interactions with the top level domain 182 of the software provider's web site 181. If the proxy 122 is installed and running on the computing device 104, the proxy 122 receives the browser's 118 request to open a connection with the first subdomain 183 and places that connection request on hold (606).

The proxy 122 next attempts to open a secure connection between the proxy 122 and the second subdomain 184 at the web server 180. In the example of FIG. 6, this connection request is initiated when the proxy 122 sends a request (607) to the DNS server 170 and the DNS server performs a DNS lookup (608) to resolve the address of the second subdomain 184. When the address of the second subdomain 184 is returned (609) to the proxy 122, the proxy 122 sends a request (610) to the web server 180 to open the secure connection between the proxy 122 and the second subdomain 184. In an example where SSL is used to secure the connection, the web server 180 returns its certificate and public key (611) to the proxy 122 and the proxy 122 validates the certificate (612) with the certificate authority 150. When the proxy 122 receives an acknowledgement (613) that the certificate is valid, the proxy 122 generates a secret key encrypted with the public key (614) and sends it to the web server 180. The web server 180 then generates a session ID (616) and sends it to the proxy 122 (617).

When the secure connection between the proxy 122 and the second subdomain 184 is established, the proxy 122 retrieves (505) from a cache 124 at the computing device 104, the desktop user ID 130 and the device identifier 132 of the computing device 104. The desktop user ID 130 is the identifier (e.g., username and/or password) used by the user to log into the desktop application 120. The user may have previously logged in to the desktop application 120, or may be prompted to do so. The device identifier 132 is a unique identifier that may have been previously assigned to the computing device 104, e.g., a MAC address or other hardware identifier. Alternatively, the device identifier 132 may be generated by the computing device 104 (e.g., by the desktop application 120) or may be generated by the web server 180 and assigned to the computing device 104.

Next, the proxy 122 encrypts (618) and sends (619) a message 506, to the second subdomain 184 over the secure connection. The encrypted message includes the desktop user ID 130 and the device identifier 132. The encrypted message may in some examples be in the form of a HTTP POST request, such as (/setDeviceID), with the parameters device identifier 132 and desktop user ID 130. In other examples, the encrypted message may instead be in the form of any other suitable web call, such as an HTTP PUT or an HTTP GET. The proxy 122 encrypts the HTTP setDeviceID request using the proxy's private encryption key.

When the encrypted message is received at the second subdomain 184 of the web server 180, the message is decrypted (620) and the desktop user ID 130 and device identifier 132 are stored (507, 621) as an entry in a cache 190 local to the web server 180. After storing this information in the cache 190, the second subdomain 184 of the web server 180 returns an acknowledgement (508, 622) to the proxy 122.

Next the proxy 122 acts on the request from the browser 118 to establish a secure connection with the first subdomain 183, which the proxy 122 had previously placed on hold. For example, the proxy 122 generates (623) and sends (509, 624) an acknowledgement message (e.g., SYNC+ACK) to the browser 118 to acknowledge the request. In response to the browser 118 initiating (625) the secure connection to the proxy 122, the proxy 122 again connects (626) to the second subdomain 184 to thereby establish a secure connection between the browser 118 and the second subdomain via the proxy 122. The second subdomain 184 of the software provider's web server 180 responds by sending (627) an SSL certificate and a public encryption key to the proxy 122, which the proxy 122 forwards (628) to the browser 118.

The browser 118 next sends a request (629) to the certificate authority 150 to validate the certificate. If the certificate authority 150 determines that the SSL certificate is valid, the certificate authority 150 sends (630) an acknowledgement to the browser 118, indicating that the certificate is valid. The browser 118 responds by generating (631) a secret encryption key and encrypts it with the public encryption key received from the second subdomain 184. The browser 118 sends (632) the encrypted encryption key to the proxy 122 and the proxy 122 forwards (633) the encrypted encryption key to the second subdomain 184. In response to receiving the encrypted encryption key from the proxy 122, the second subdomain 184 generates (634) a session identifier and sends (635) it to the proxy 122, which forwards (636) the message to the browser 118.

After receiving the session identifier to complete the establishment of the secure connection between the browser 118 and the second subdomain 184 via the proxy, the browser 118 creates and encrypts using its encryption key (637) a request to the second subdomain 184 for the device identifier 132 of the computing device 104. The request includes the online user ID 140 that was input to the browser 118. As an example, the request may be an HTTP GET request (/getDeviceID) with parameter online user ID 140. In other examples, any suitable message can be used instead, such as an HTTP POST or an HTTP PUT message.

The browser 118 sends (510, 638) the encrypted request to the proxy 122, and in turn the proxy 122 forwards (511, 639) the encrypted request to the second subdomain 184. The second subdomain 184 decrypts the encrypted request to extract the desktop user ID (640) and then checks (641) its cache 190 to determine whether the online user ID 140 matches a user identifier in one of the cache entries. If the desktop user ID 130 is not in the cache 190, the software provider's web server 180 informs the browser 118 by negative acknowledgement or some other error message. This means that the user attempting to log into the online account using the online user ID 140 is not the same as the user logged into the desktop application 120. However, if the second subdomain 184 determines that the online user ID 140 matches the desktop user ID 130 stored in the cache 190, it retrieves (512, 642), from the cache 190 the device identifier 132 associated with the desktop user ID 130. If available, the machine state and/or other data associated the computing device 104 may also be retrieved.

The second subdomain 184 generates and encrypts (643) a message containing the retrieved data and sends (513, 644) this message to the proxy 122, which forwards (514, 645) the encrypted message to the browser 118. In an example, the message sent by the second subdomain 184 may be a response to a HTTP GET request and may be in the form userid:(deviceid). The browser then decrypts (646) the message to extract the device identifier 132 of the computing device 104 and any other included information.

The browser may then pass the device identifier and any other received information to the web server 180, e.g., to the top level domain 182 of the web site 181, via a secure connection. Following this sequence, the software management system available through the top level domain 182 can use that information to determine and display those of the software provider's software applications 110 that are available for installation and/or upgrading on the computing device 104.

Figure 7:
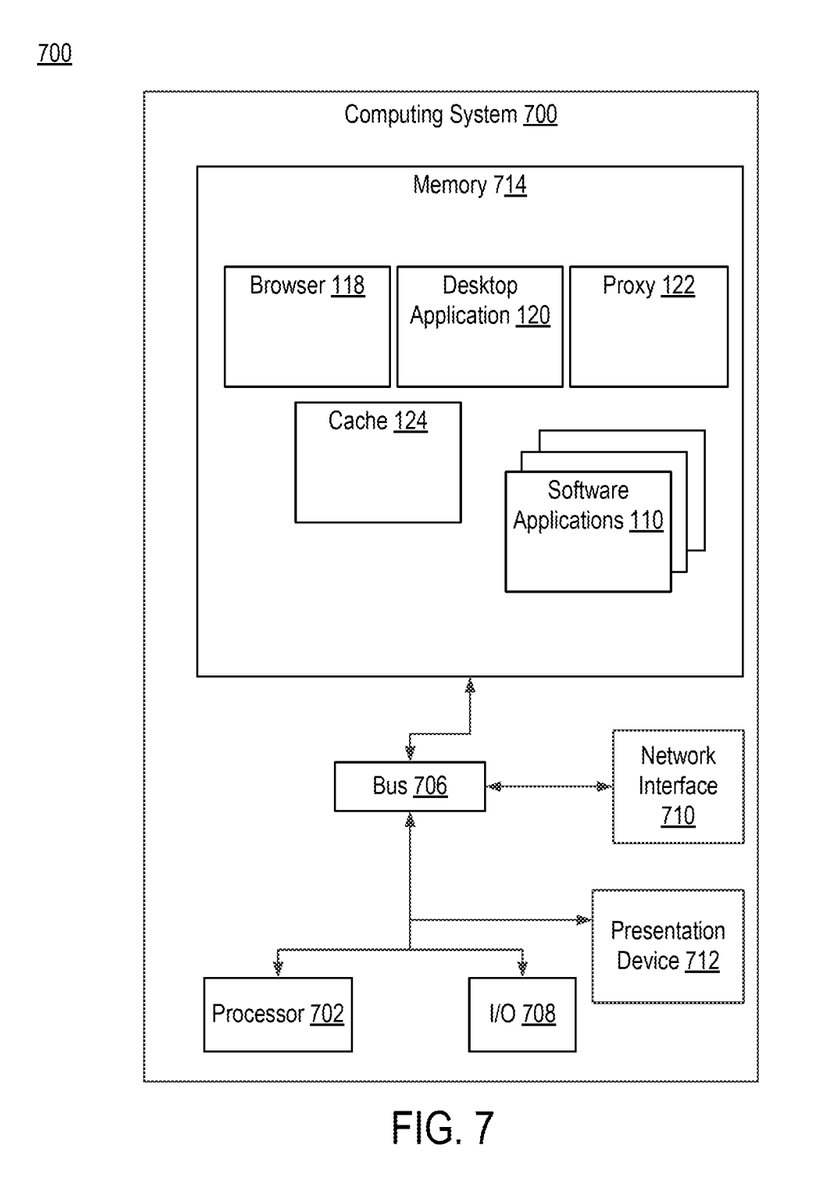
FIG. 7 is a diagram depicting an example computing system environment configured for implementing the various processes and methods of embodiments described herein.

FIG. 7 is a diagram depicting an example system environment for securely identifying a device using a DNS-controlled proxy according to certain embodiments. The computing system 700 includes one or more processors 702 communicatively coupled to one or more memory devices 714. The processor 702 executes computer-executable program code, which can be in the form of non-transitory computer-executable instructions, stored in the memory device 714, accesses information stored in the memory device 714, or both. Examples of the processor 702 include a microprocessor, an application-specific integrated circuit ("ASIC"), a field-programmable gate array ("FPGA"), or any other suitable processing device. The processor 702 can include any number of processing devices, including one.

The memory device 714 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices such as input or output devices. For example, the computing system 700 is shown with an input/output ("I/O") interface 708 that can receive input from input devices or provide output to output devices. A bus 706 can also be included in the computing system 700. The bus 706 can communicatively couple one or more components of the computing system 700 and allow for communication between such components.

The computing system 700 executes program code that configures the processor 702 to perform one or more of the operations described above with respect to FIGS. 1-6. browser 118, desktop application 120, proxy 122, cache 124, and software application 110. The program code of the browser 118, desktop application 120, proxy 122, cache 124, and software application 110, which can be in the form of non-transitory computer-executable instructions, can be resident in the memory device 714 or any suitable computer-readable medium and can be executed by the processor 702 or any other one or more suitable processor. Execution of such program code configures or causes the processor(s) to perform the operations described herein with respect to the computing device 104. In additional or alternative embodiments, the program code described above can be stored in one or more memory devices accessible by the computing system 700 from a remote storage device via a data network. The computing device 104 and any processes can use the memory device 714. The memory device 714 can store, for example, additional programs, or data used by the applications executing on the processor 702.

The computing system 700 also includes at least one network interface 710. The network interface 710 includes any device or group of devices suitable for establishing a wired or wireless data connection to one or more data networks. Non-limiting examples of the network interface 710 include an Ethernet network adapter, a modem, and/or the like. The computing system 700 is able to communicate with one or more other computing devices or computer-readable data sources via a data network using the network interface 710.

In some embodiments, the computing system 700 includes a presentation device 712. A presentation device 712 can include any device or group of devices suitable for providing visual, auditory, or other suitable sensory output. Non-limiting examples of the presentation device 712 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method of determining a device identifier, the method comprising:
   at a proxy, retrieving a first user identifier and a device identifier associated with a computing device from a cache of the computing device and sending the first user identifier and the device identifier over a first secure network connection in a first encrypted message to a web server, wherein the web server decrypts the first encrypted message and stores the first user identifier and the device identifier as an entry in a cache of the web server;
   responsive to receiving an acknowledgement at the proxy from the web server, establishing a second secure network connection between a browser and the web server via the proxy;
   at the proxy, receiving a second encrypted message from the browser comprising a second user identifier and forwarding the second encrypted message to the web server over the second secure network connection, wherein the web server decrypts the second encrypted message, determines that the second user identifier matches the first user identifier stored in the cache of the web server, and extracts the device identifier associated with the first user identifier from the cache of the web server; and
   at the proxy, receiving a third encrypted message comprising the device identifier from the web server over the second secure network connection and forwarding the third encrypted message to the browser over the second secure network connection, wherein the browser decrypts the third encrypted message to obtain the device identifier and sends the device identifier to a web site hosted by the web server, and wherein the device identifier is accessible to the web server via the browser and indicates, to the web server an installation state of a software application on the computing device.

2. The method of claim 1, wherein the first encrypted message is a first encrypted HTTP request and the second encrypted message is a second encrypted HTTP request.

3. The method of claim 1, further comprising:
   receiving, at the proxy, a request from the browser to establish a secure connection via the proxy between the browser and a first subdomain of the web site,
   wherein retrieving the first user identifier is performed without acknowledging the request from the browser.

4. The method of claim 3, wherein establishing the second secure network connection is performed in response to receiving an acknowledgment of the second encrypted message.

5. The method of claim 3, wherein the browser resolves an address of the first subdomain with a Domain Name Server and the Domain Name Server returns an address of the proxy to redirect the request from the browser to the proxy.

6. The method of claim 1, wherein the first user identifier corresponds to a in to a desktop application running on the computing device; and
   wherein the second user identifier corresponds to a login to a website hosted on the web server.

7. The method of claim 1, wherein
   wherein determining by the web server that the second user identifier matches the first user identifier stored in the cache of the web server indicates that the browser is executing on the computing device.

8. The method of claim 1, wherein security settings of the browser prevent the browser from retrieving the device identifier directly from the cache of the computing device.

9. The method of claim 1, wherein a machine state of the computing device is included in both the first encrypted message and the third encrypted message.

10. A system comprising:
    a web server;
    a proxy comprising:
      a processing device; and
      a non-transitory computer-readable medium having program code stored thereon that, when executed by the processing device, cause the processing device to perform operations comprising:
        receiving a connection request from a browser executing on a computing device;
        while holding open the connection request from the browser, establishing a fir secure network connection to the web server via a network;
        retrieving a first user identifier and a device identifier associated with the computing device from a cache of the computing device and sending the first user identifier and the device identifier over the fir secure network connection in a first encrypted message to the web server;
        responsive to receiving an acknowledgement at the proxy from the web server, establishing a second secure network connection between the browser and the web server via the proxy;
        receiving a second encrypted message from the browser comprising a second user identifier and forwarding the second encrypted message to the web server over the second secure network connection; and
        receiving a third encrypted message comprising the device identifier from the web server over the second secure network connection and forwarding the third encrypted message to the browser over the second secure network connection, wherein
    the web server is configured to:
      receive, from the proxy, the first user identifier and the device identifier;

store the first user identifier in a cache of the web server;

send the acknowledgement to the proxy;

decrypt the second encrypted message;

determine that the second user identifier matches the first user identifier stored in the cache of the web server;

extract the device identifier associated with the first user identifier from the cache of the web server; and send the third encrypted message comprising the device identifier to the browser.

11. The system of claim 10, wherein the proxy establishes the second secure network connection using a second address resolved from a second Uniform Resource Locator associated with a second subdomain of a top level domain.

12. The system of claim 10, wherein the first user identifier corresponds to a login to a desktop application running on the computing device;

wherein the second user identifier corresponds to a login to a website hosted by the web server using the browser; and wherein determining that the second user identifier matches the first user identifier stored in the cache of the web server indicates that both the browser and the desktop application are executing on the computing device.

13. The system of claim 10, wherein a machine state of the computing device is included in both the first encrypted message and the third encrypted message.

14. A non-transitory computer-readable storage medium storing computer-executable program instructions, wherein when executed by a processing device the computer-executable program instructions cause the processing device to perform a method comprising:

a step for retrieving, at a proxy, a first user identifier and a device identifier associated with a computing device using a browser, from a cache of the computing device and sending the first user identifier and the device identifier over a first secure network connection in a first encrypted message to a web server, wherein the web server decrypts the first encrypted message and stores the first user identifier and the device identifier as an entry in a cache of the web server;

a step for establishing, responsive to receiving an acknowledgement at the proxy from the web server, a second secure network connection between the browser and the web server via the proxy;

a step for receiving, at the proxy, a second encrypted message from the browser comprising a second user identifier and forwarding the second encrypted message to the web server over the second secure network connection, wherein the web server decrypts the second encrypted message, determines that the second user identifier matches the first user identifier stored in the cache of the web server, and extracts the device identifier associated with the first user identifier from the cache of the web server; and a step for receiving, at the proxy, a third encrypted message comprising the device identifier from the web server over the second network secure connection and forwarding the third encrypted message to the browser over the second secure network connection, wherein the browser decrypts the third encrypted message to obtain the device identifier.

15. The non-transitory computer-readable storage medium of claim 14, wherein the computer-executable program instructions cause the processing device to further perform:

a step for receiving, at the proxy, a connection request from the browser; and a step for establishing the first secure network connection between the proxy and the web server without acknowledging the connection request from the browser.

16. The non-transitory computer-readable storage medium of claim 15, wherein the web server hosts a subdomain of a web site.

17. The non-transitory computer-readable storage medium of claim 14, wherein determining by the web server that the second user identifier matches the first user identifier stored in the cache of the web server indicates that the browser is executing on the computing device.

18. The non-transitory computer-readable storage medium of claim 14, wherein the computer-executable program instructions cause the processing device to further perform a step for receiving a connection request from the browser, and wherein the browser generates the connection request by resolving an address of a first subdomain with a Domain Name Server and the Domain Name Server returns an address of the proxy to redirect the connection request from the browser to the proxy.

19. The non-transitory computer-readable storage medium of claim 14, wherein a machine state of the computing device is included in both the first encrypted message and the third encrypted message.

* * * * *